(12) United States Patent
Miclo

(10) Patent No.: US 11,365,545 B2
(45) Date of Patent: Jun. 21, 2022

(54) METHOD OF MANUFACTURING A PLASTIC COVERING PANEL AND THE PANEL OBTAINED

(71) Applicants: INOVAME, Duppigheim (FR); KREAFIN GROUP SA, Luxembourg (LU)

(72) Inventor: Thierry Miclo, Hoenheim (FR)

(73) Assignees: INOVAME; KREAFIN GROUP SA, Luxembourg (LU)

(*) Notice: Subject to any disclaimer, the term of this patent is extended or adjusted under 35 U.S.C. 154(b) by 15 days.

(21) Appl. No.: 16/963,517

(22) PCT Filed: Jan. 21, 2019

(86) PCT No.: PCT/FR2019/050116
§ 371 (c)(1),
(2) Date: Jul. 21, 2020

(87) PCT Pub. No.: WO2019/141954
PCT Pub. Date: Jul. 25, 2019

(65) Prior Publication Data
US 2021/0047838 A1    Feb. 18, 2021

(30) Foreign Application Priority Data

Jan. 22, 2018 (FR) .................................. FR1850487
Mar. 16, 2018 (BE) .................................. 2018/5173

(51) Int. Cl.
*E04F 13/08*    (2006.01)
*E04F 15/02*    (2006.01)
(Continued)

(52) U.S. Cl.
CPC ........ *E04F 13/0894* (2013.01); *B29C 65/565* (2013.01); *B29C 66/43* (2013.01);
(Continued)

(58) Field of Classification Search
CPC ..... E04F 13/18; E04F 13/185; E04F 13/0894; E04F 15/105; E04F 15/02038;
(Continued)

(56) References Cited

U.S. PATENT DOCUMENTS 7,451,578 B2 * 11/2008 Hannig ................. F16B 5/0044
                                                        52/586.1
8,544,230 B2 * 10/2013 Pervan ............. E04F 15/02022
                                                        52/582.1
(Continued)

FOREIGN PATENT DOCUMENTS

EP        3121348 A1     1/2017
WO     WO2007141605 A2  12/2007
WO     WO2012001503 A1   1/2012

OTHER PUBLICATIONS

Search Report for International Patent Application PCT/FR2019/050116, dated Jul. 25, 2019.

*Primary Examiner* — Jessie T Fonseca
(74) *Attorney, Agent, or Firm* — Fresh IP PLC; Clifford D. Hyra; Aubrey Y. Chen

(57) ABSTRACT

Method for manufacturing a plastic panel having a first side (1) with a hook (11), a first assembly cavity (12) and a locking cavity (13) which is recessed and whose upper side forms a bearing surface and a protrusion (21) comprising a beak (24) in the junction plane, an inset recess (23) continuing by a bearing point (32) connecting with a groove (31), a flexible lock (3) which can retract by elastic deformation into the recess (23) during the assembly movement of the panel (100a) to be installed and extend inside the locking cavity (13).
According to the method, the first side (1) is machined (I) to its final section and with the blank of the second side (2) with
(Continued)

Figure 1:
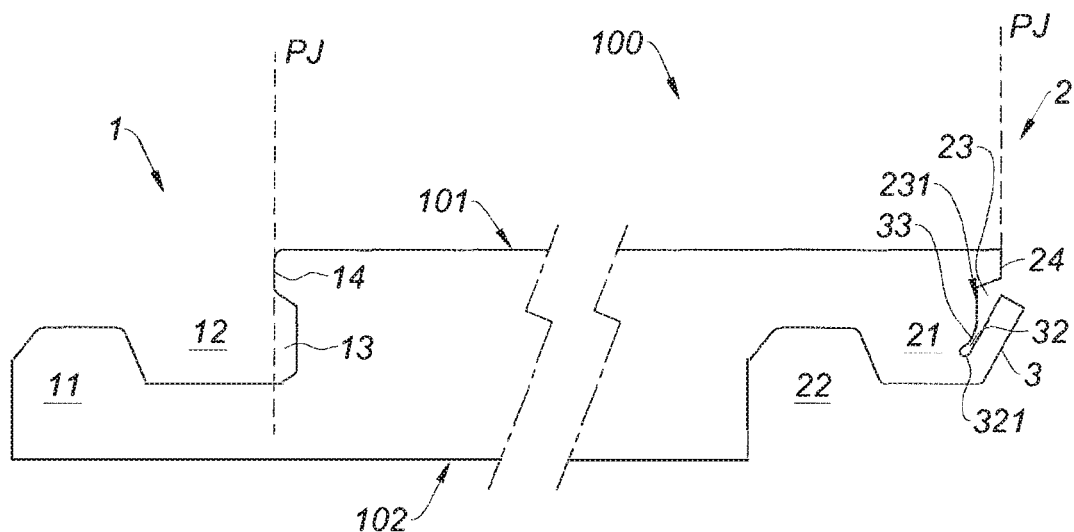

a protruding tab (4) which is locally heated (II) after cooling (III) to bend it and form the lock (3).

8 Claims, 7 Drawing Sheets

(51) Int. Cl.
*B29C 65/56* (2006.01)
*B29C 65/00* (2006.01)
*E04F 13/18* (2006.01)
*E04F 15/10* (2006.01)
*B29L 31/00* (2006.01)

(52) U.S. Cl.
CPC ........ *E04F 13/18* (2013.01); *E04F 15/02038* (2013.01); *E04F 15/105* (2013.01); *B29L 2031/732* (2013.01); *B29L 2031/776* (2013.01); *E04F 2201/0161* (2013.01); *E04F 2201/023* (2013.01); *E04F 2201/043* (2013.01)

(58) Field of Classification Search
CPC ...... E04F 2201/0146; E04F 2201/0161; E04F 2201/023; E04F 2201/043; B29C 65/56; B29C 65/565; B29C 66/43; B29C 66/71; B29L 2031/732; B29L 2031/776; B29L 2031/3017
See application file for complete search history.

(56) References Cited

U.S. PATENT DOCUMENTS

| | | | | |
|---|---|---|---|---|
| 8,966,852 B2* | 3/2015 | Cappelle | ............... | E04F 15/045 52/582.1 |
| 8,978,334 B2* | 3/2015 | Engstrom | ............... | E04F 15/02 52/582.1 |
| 2007/0006543 A1* | 1/2007 | Engstrom | ................. | E04C 2/38 52/582.1 |
| 2008/0110125 A1* | 5/2008 | Pervan | ................... | E04F 15/02 52/582.2 |
| 2008/0134613 A1* | 6/2008 | Pervan | ................... | E04F 15/02 52/582.2 |
| 2008/0236088 A1* | 10/2008 | Hannig | ................ | B27M 3/0066 52/592.1 |
| 2009/0019806 A1* | 1/2009 | Muehlebach | ........... | E04F 15/02 52/588.1 |
| 2009/0217615 A1* | 9/2009 | Engstrom | ................. | E04B 1/54 52/588.1 |
| 2009/0308014 A1* | 12/2009 | Muehlebach | ........... | E04F 15/02 52/592.4 |
| 2010/0043333 A1* | 2/2010 | Hannig | ................... | E04F 15/02 52/582.2 |
| 2011/0173914 A1* | 7/2011 | Engstrom | ............. | F16B 5/0016 52/582.2 |
| 2011/0271632 A1* | 11/2011 | Cappelle | ................ | F16B 5/0056 52/582.2 |
| 2012/0055112 A1* | 3/2012 | Engstrom | ......... | E04F 15/02144 52/582.2 |
| 2013/0014463 A1* | 1/2013 | Pervan | ............. | E04F 15/02038 52/588.1 |
| 2013/0042562 A1* | 2/2013 | Pervan | ..................... | E04B 5/02 52/582.2 |
| 2013/0192158 A1* | 8/2013 | Cappelle | ................ | B44C 5/043 52/588.1 |
| 2013/0263454 A1* | 10/2013 | Boo | .................. | E04F 15/02038 29/897.32 |
| 2014/0283476 A1* | 9/2014 | Engstrom | ............... | E04F 15/02 52/582.2 |
| 2014/0290173 A1* | 10/2014 | Hamberger | ....... | E04F 15/02038 52/582.2 |
| 2015/0184397 A1* | 7/2015 | Engstrom | ............... | E04F 15/02 52/582.2 |
| 2015/0267418 A1* | 9/2015 | Vermeulen | ............ | E04F 15/105 52/582.2 |
| 2016/0115695 A1* | 4/2016 | Devos | .................. | E04F 15/107 52/582.2 |
| 2019/0119928 A1* | 4/2019 | Pervan | ............. | E04F 15/02038 |
| 2021/0001662 A1* | 1/2021 | Miclo | ..................... | B27M 3/04 |

* cited by examiner

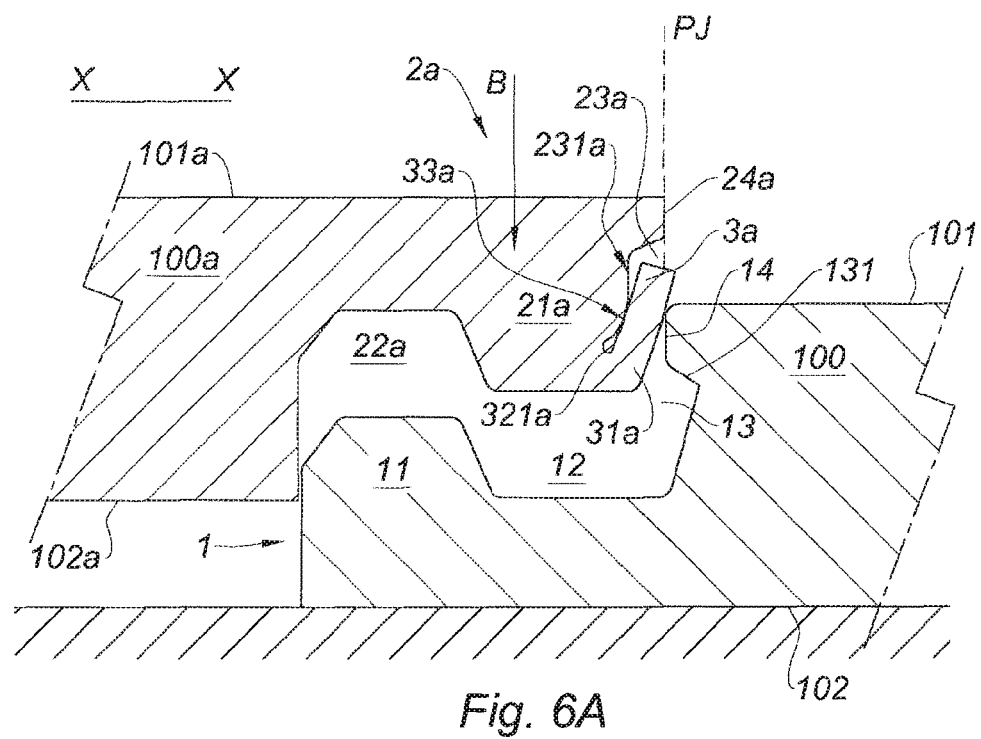
Fig. 6A
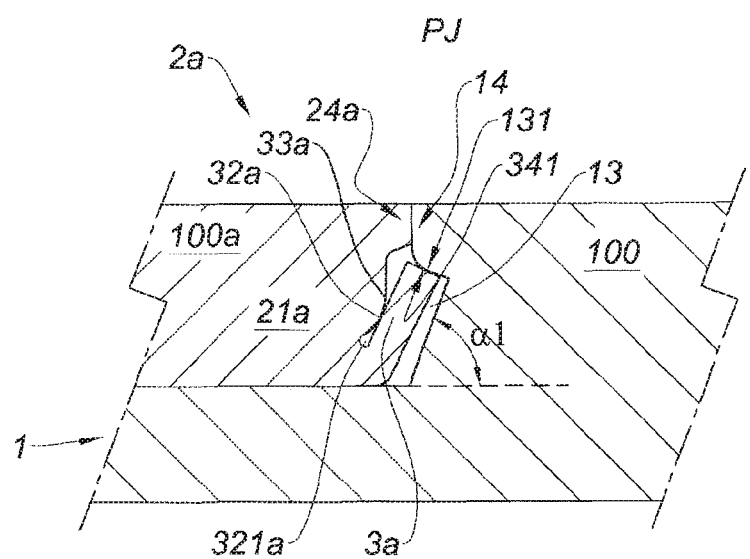
Fig. 6B
Fig. 6

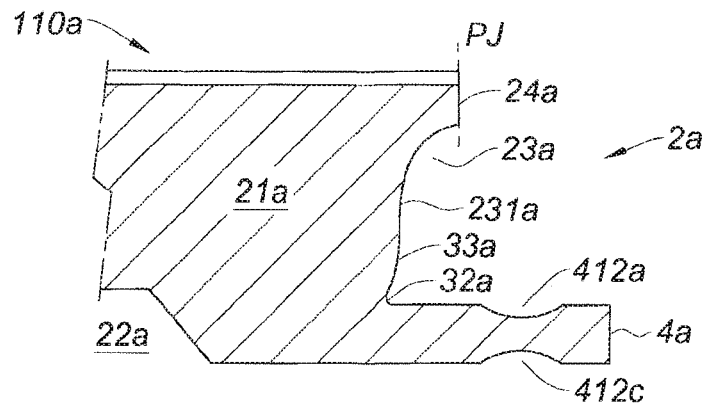
Fig. 7A
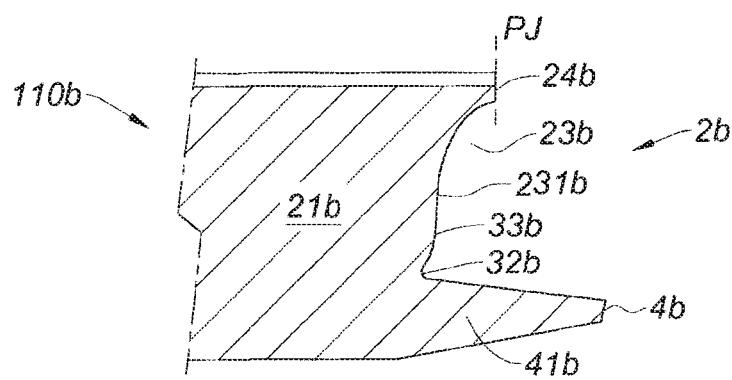
Fig. 7B
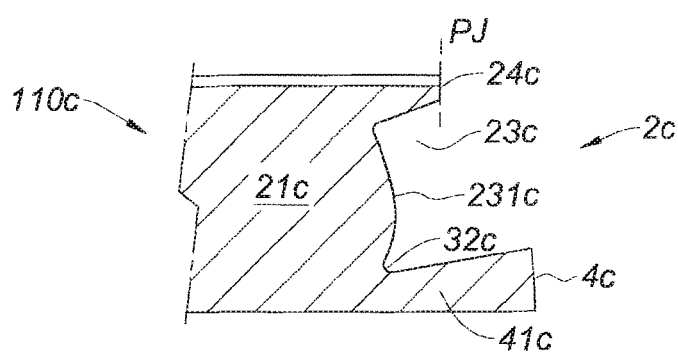
Fig. 7C
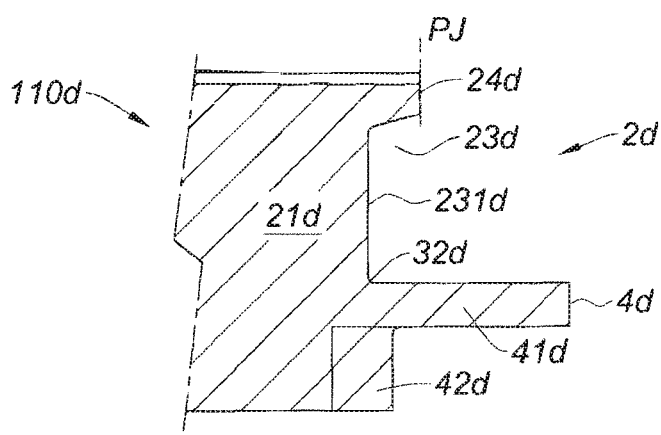
Fig. 7D
Fig. 7

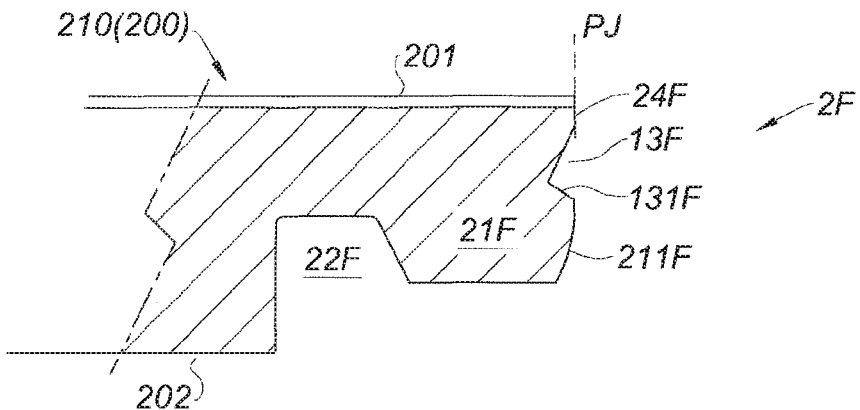
*Fig. 10a*
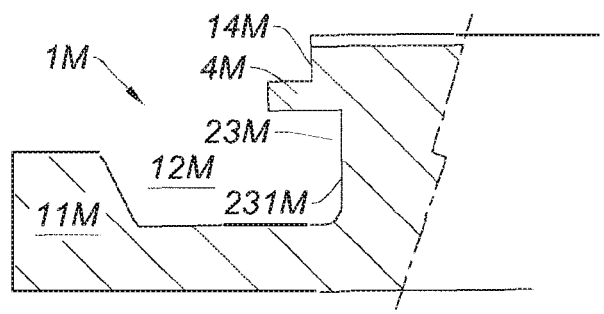
*Fig. 10b*
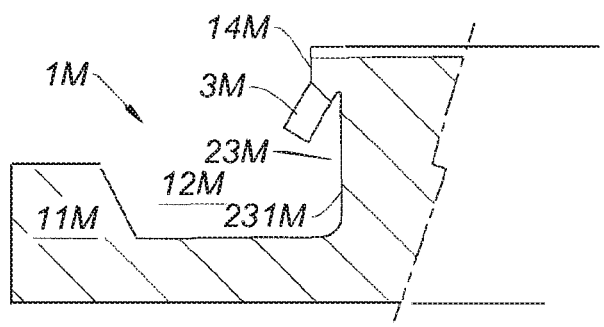
*Fig. 10c*
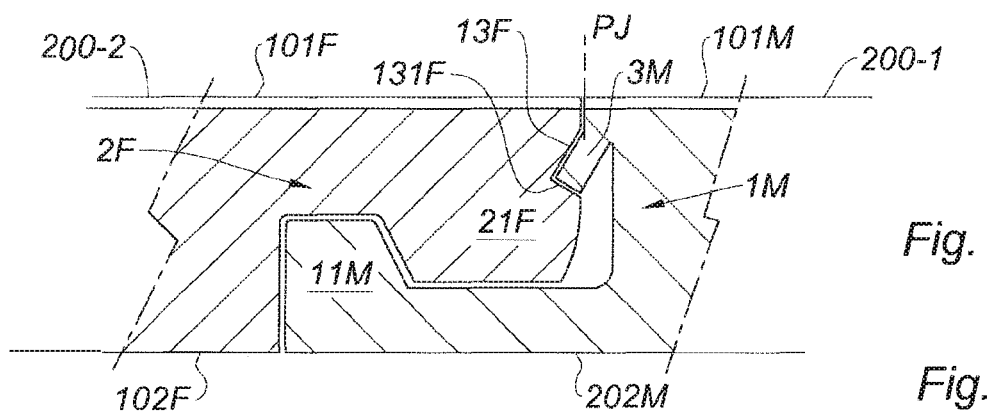
*Fig. 10d*
*Fig. 10*

US 11,365,545 B2

METHOD OF MANUFACTURING A PLASTIC COVERING PANEL AND THE PANEL OBTAINED

FIELD OF THE INVENTION

This invention refers to a method for manufacturing a plastic covering panel comprising two pairs of parallel sides to be assembled by its pairs of sides with other panels of the same type the pairs of sides of which have matching assembly profiles, one top and one bottom. The panel has a pair of sides designed to be assembled by the pivoting of one side of a panel into the matching side of another already installed panel, and another pair of sides to be assembled by the interleaving of the shapes and clipping by the pivoting movement of the panel into the matching side of another already installed panel.

In practice, the covering panels consist of covering strips the first pair of sides of which is used for assembly by pivoting the panels from one installation row to another, and the second pair of transverse sides ensuring assembly by clipping.

More generally, the scope of the invention concerns a method for manufacturing a floor or wall covering panel having parallel sides in pairs, more particularly a rectangular panel shaped as a covering strips or tiles of plastic, such as PVC. If necessary, this panel has a decorated side imitating a natural wall covering such as wood, stone or ceramic, or otherwise a decorative pattern.

More specifically, the scope of the invention is a method for manufacturing a plastic covering panel with two pairs of parallel sides for assembly by its pairs of sides to other panels of the same type the pairs of sides of which have matching complementary assembly profiles, with each panel installed in the following installation row being assembled by the pivoting of one side of a pair into the matching complementary side of another panel already installed in the first installation row while pivoting also ensures the interleaving of the shapes and the clipping of the transverse side of the other pair into the matching complementary transverse side of the other panel already installed in the installation row of this panel being installed, with the pair of sides for assembly by the interleaving of the shapes and by clipping having a first transverse side and a second transverse side.

The invention also refers to the panels produced according to this method.

STATE OF THE TECHNIQUE

The covering panels generally have two parallel sides in a complementary male/female shaped design for assembly to engage a male side of a panel to be installed into the female side of the installed panel(s) and the folding down (pivoting/tilting) of the panel to obtain an assembly resisting traction and compression forces in the installation plane and in a direction perpendicular to the junction line, and to the "vertical" lifting forces perpendicular to the installation plane.

Such panels and their assembly system are described in many documents, for instance, in the patents EP 562 402, EP 085 196, EP 843 763, EP 1 669 512.

These documents concern the assembly by pivoting, generally for the connection by the "large sides" of rectangular panels, especially in the form of covering strips, whereas the "small sides" have complementary profiles which assemble from one panel to the next when the panel to be installed is pivoted, forming a mechanical connection resisting forces in the positioning plane and in the direction perpendicular to the positioning plane.

In some cases, this connection is completed by the clipping of a flexible or rigid locking tab activated by hand after assembly by pivoting (EP 1 669 512).

Assembly by clipping in is described more particularly in the document EP 2 194 210 concerning a panel whose transverse clipping side has a flexible tab inserted into a groove on the machined side of the panel. This tab, retracting during the pivoting movement, and made separately, is of flexible material. It is inserted into a groove on the side of the panel which is of rigid material, such as medium.

But these various means of locking in a direction perpendicular to the positioning plane can only applied to panels having sufficient thickness to accommodate a mechanical or elastic locking device. They are unsuitable for thin panels such as PVC covering LVT covering strips or made of another plastic material with thickness of around 4 to 5 mm

SCOPE OF THE INVENTION

The purpose of this invention is to develop a process for the manufacturing of a plastic covering panel for the clipped assembly of at least one side provided with a locking tab.

The invention also aims at the development of a plastic covering panel for a clipped assembly of at least one side provided with a locking tab and more particularly the small sides of the panels which are also engaged into one another by a pivoting movement of the complementary shapes of the two large sides.

BRIEF AND ADVANTAGES OF THE INVENTION

For this purpose, the aim of the invention is a method for manufacturing a plastic covering panel with two pairs of parallel sides, to be assembled by pairs of sides on other panels of the same type of which the pairs of side have matching assembly profiles, one top and one bottom and whereby the sides of the panels are assembled along junction planes with each panel having one pair of sides for assembly by the pivoting of the side of a panel into the matching side of another already installed panel with an initial transverse side having a junction plane with the edge of the top of the panel continuing in a locking cavity opening upwards and having a hook, The second transverse side, matching the first side and having an upper edge in the junction plane terminating in a protrusion and separated from the panel body by the assembly cavity of a panel fitting over the hook of another panel and a protrusion housed in this cavity of the other panel, with the method characterized in that a blank of the pair of transverse sides is formed, giving the first side its definitive section and, on the second side, forming an assembly cavity opening out into the bottom of the profile and a protrusion with a beak entering the junction plane and followed by an inset recess in the junction plane the bottom of which connects with the beginning of a groove and extends by a protruding tab in the base of the protrusion, the area at the base of the tab is heated locally, then when this area has softened, the tab is raised towards the recess to form the lock, and the form is stabilized by cooling it to obtain the panel whose two transverse sides have assumed their final shape.

This process can be used for producing a covering panel of plastic ensuring efficient and lasting locking of the sides assembled by clipping together, despite the thinness of such panels.

The method of manufacturing avoids the forming and development of breakage cracks at the base of the block, endowing the lock, which is exposed to constant compression and relaxation movements under the effect of people walking over the floor covering formed by the assembled assembly of such panels, with excellent reliability.

In general, locking involves the small sides of the covering panels because it is easier to assemble the large sides by the simple pivoting movement of the blades.

Accordingly to another particularly advantageous characteristic, the blank of the pair of transverse sides is formed by lathe milling the first side to its final section and by lathe milling, forming on the second side and assembly cavity opening out into the bottom of the profile and a protrusion with a nose, followed by a recess inset from the junction plane and the bottom of which continues by a curved convex bearing point which connects to the beginning of a groove, extending by a protruding tab from the base of the protrusion.

According to another advantageous characteristic, at least one of the sides will be machined by milling.

According to another advantageous characteristic, the profile will be shaped with a rounded groove connecting the curved support and the side of the tab base.

According to another advantageous characteristic, the tab is shaped to have an inclined angle with respect to the junction plane of the panel, exceeding 90°.

The method of the invention is a simple and economical way of making a plastic covering panel which clips by two sides while leaving a gap between the lock and the bottom of the recess, favoring the retraction of the lock during assembly on the passage of the beak which enters the junction plane in spite of the very small size of the strip forming the lock.

The scope of the invention is also a method for manufacturing a plastic covering panel comprising two pairs of parallel sides to be assembled with other panels of the same type the pairs of sides of which have matching assembly profiles. The panel has:
- One pair of sides for assembly by the pivoting of one side of the panel into the matching side of and another already installed panel, and
- one pair of transverse sides for the assembly by interleaving of shapes and by clipping in by this pivoting movement into the matching transverse side of another already installed panel.
- The first side of this pair of sides has a hook and an initial assembly cavity,
  - opening out into the top of the panel
  - traversed by the junction plane of the two sides, and having
  - a locking cavity recessed from the junction plane and whose upper side forms a bearing surface,
- the second side of this pair of sides having a second assembly cavity opening out into the bottom of the panel to accommodate the first hook of the adjacent panel, and an inverted hook forming a protrusion entering the first assembly cavity of the first side of this adjacent panel
  - the side of the protrusion with a beak and having a bearing surface in the junction plane to reach the top of the panel,
  - a recessed insert from the junction plane continuing towards the bottom in the form of a flexible lock, consisting of an inclined tab, oriented upwards and the base of which begins in the protrusion, this method is characterized in that
- by milling, the blank section of the pair of transverse sides is formed by lathe milling the first side to its final section and by lathe milling, forming on the second side an assembly cavity opening out into the bottom of the profile and a protrusion with a beak, followed by a recess inset from the junction plane and the bottom of which continues by a curved convex bearing which connects to the beginning of a groove, extending by a protruding tab from the base of the protrusion.
- the area at the base of the tab is heated locally,
- then when this area has softened, the tab is raised towards the recess to form the lock, and
- the form is stabilized by cooling it to obtain the panel whose two transverse sides have assumed their final shape.

The invention also aims at the development of a plastic covering panel for a clipped assembly of at least one side provided with a locking tab and more particularly the small sides of the panels which are also engaged into one another by a pivoting movement of the complementary shapes of the two large sides.

The plastic covering panel comprises two pairs of parallel sides to be assembled with other panels of the same type the pairs of sides of which have matching assembly profiles. the panel has:
- One pair of sides for assembly by the pivoting of one side of the panel into the matching side of and another already installed panel, and
- one pair of transverse sides for the assembly by the interleaving of the forms and their clipping by this pivoting movement in the corresponding transverse side of another already installed panel,
- The first side of this pair of sides has a hook and an initial assembly cavity,
  - opening into the top of the panel,
  - traversed by the junction plane of the two sides and having
  - a locking cavity inset from the junction plane the upper side of which forms a bearing surface,
- the second side of this pair of sides having a second assembly cavity opening out into the bottom of the panel to accommodate the first hook of the adjacent panel, and an inverted hook forming a protrusion entering the first assembly cavity of the first side of this adjacent panel
  - the side of the protrusion with a beak and having a bearing surface in the junction plane to reach the top of the panel,
  - A recess inset from this junction plane continues to the bottom of a flexible lock consisting of an inclined tab, oriented upwards and the base of which derives from the protrusion.

According to another characteristic, the inset recess of the junction plane connects to the beginning of a groove and extends in a tab protruding from the base of the protrusion, rises towards the recess to constitute the lock.

The panel obtained by the method of the invention is particularly easy to install because of the curved, convex bearing point whereby the lock undergoes elastic deformation to retract then spring back by an elastic effect into the locking cavity. This particularly efficient and reliable elasticity is based essentially on the deformation of the lock rather than on a solicitation at the base of the lock. This base whose shaping is permanent, provides a particularly strong support for the lock.

According to another advantageous characteristic, the inset recess of the junction plane has a base continuing in a curved and convex support connecting with the beginning of the groove and extending in the tab. This embodiment of the recess facilitates the interleaving of the two complementary shapes of the panel installed on the panel being installed.

According to another advantageous characteristic, the profile will be shaped with a rounded groove connecting the curved support and the side of the tab base.

According to another advantageous characteristic, the covering strip is chosen from a group including:

A covering strip with local reduction of the thickness

A covering strip with an enlarged base compared to the thickness of the covering strip which decreases towards its end, A covering strip with a reduced base compared to the thickness of the covering strip which increases towards its end, A covering strip with an increased bearing surface.

These various covering strip shapes used to obtain the lock by thermoforming are advantageous special shapes, depending on the nature of the plastic material from which the panel is made.

According to another advantageous characteristic, the two transverse sides each terminate in a hook, preceded by a corresponding assembly cavity.

The hook of the first transverse side of a panel, engaged in the cavity of the second transverse side of a previous panel and reciprocally, the cavity of the second transverse side of the panel receiving the hook of the first transverse side of the next panel, the side forming the beak of the hook of a panel has a locking cavity the side of which forms a bearing surface for the lock of the previous panel and the side forming the nose above the assembly cavity of the previous panel is followed by a lock beneath the nose.

This covering panel has the advantage of ensuring the assembly of the smaller sides in a particularly efficient way.

ILLUSTRATIONS

Figure 2:
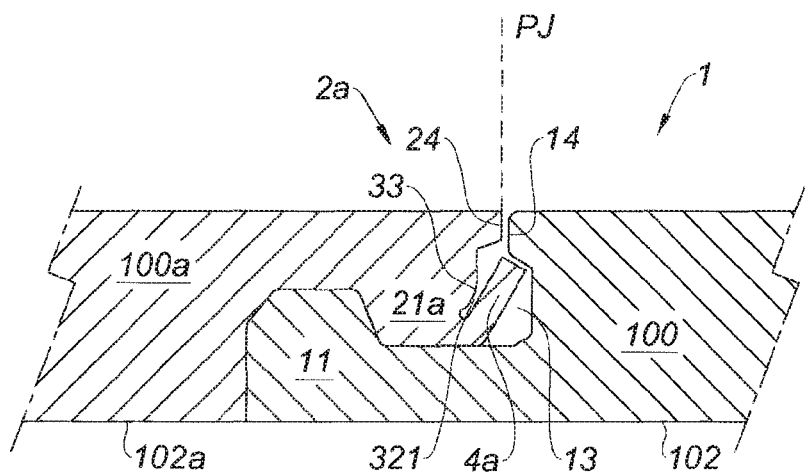
Figure 3:
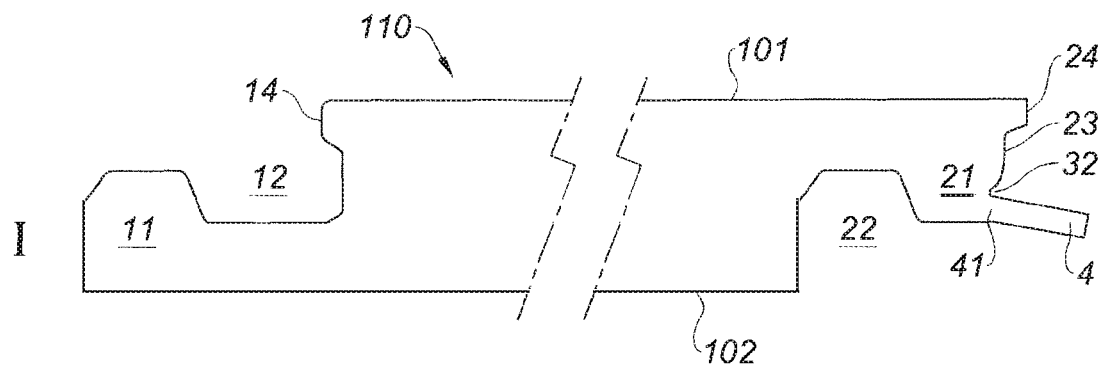
Figure 3:
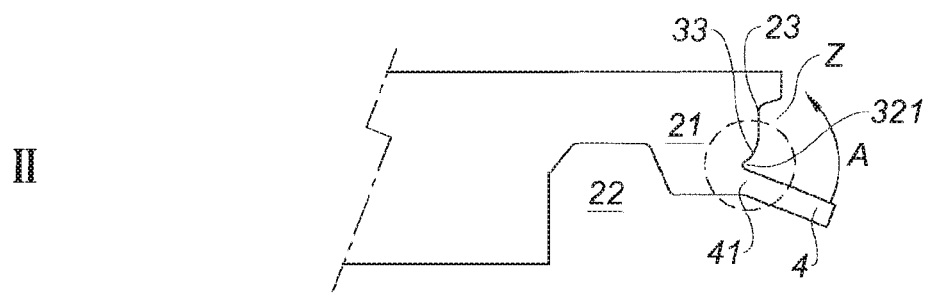
Figure 3:
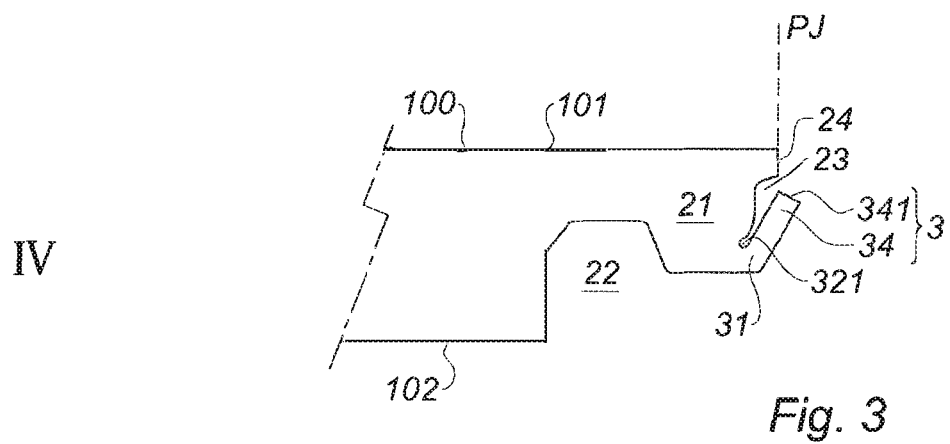
Figure 4:
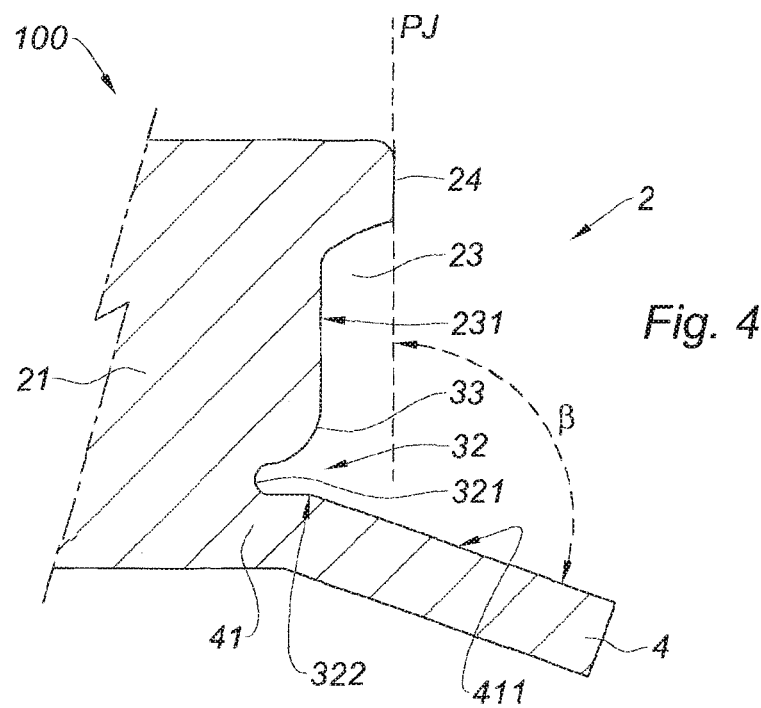
Figure 5:
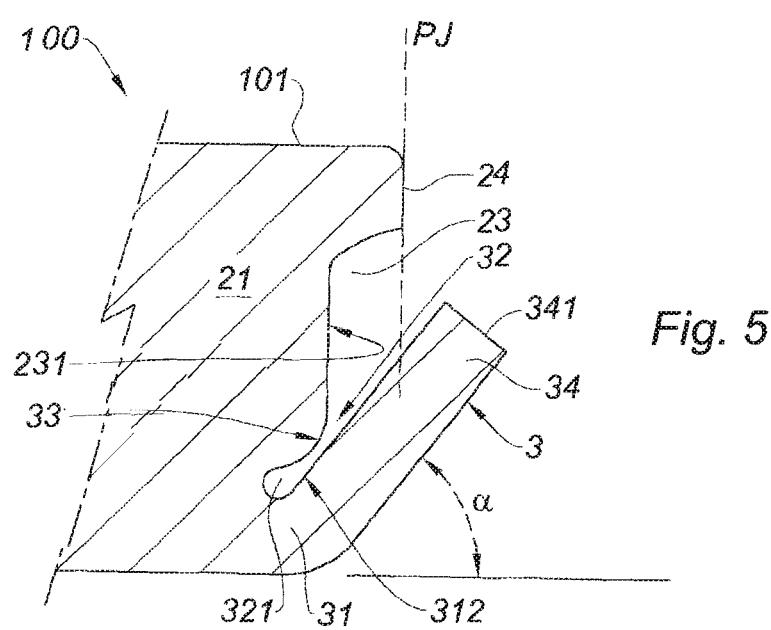

The process according to the invention will be described in greater detail below by means of implementation examples represented in the attached illustrations in which:

FIG. 1 is a schematic section of a plastic covering material produced according to the method of the invention, FIG. 2 is a partial sectional view of the assembly of two panels according to the invention, FIG. 3, in its parts I-IV, represents the various manufacturing stages of a covering panel using the method of the invention, FIG. 4 is an enlarged scale sectional view of the side of a profile with a locking tab, in its shape at the end of machining, FIG. 5 is a sectional view of the profile according to the invention at the end of the manufacturing process, FIG. 6, in its parts 6A, 6B, represents the assembly movement by the folding down of two panels according to the invention.

Figure 8:
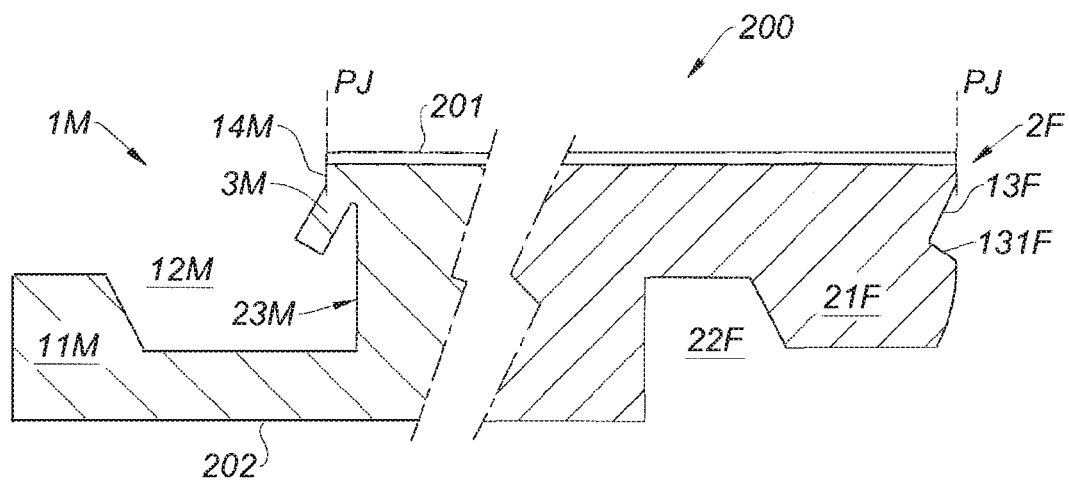
Figure 9:
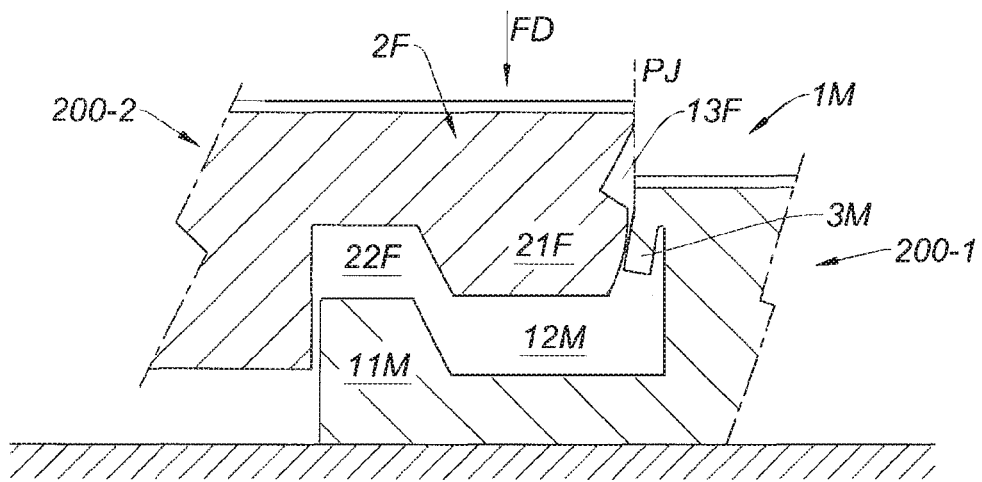

FIG. 7 in its parts 7a-7d shows the various machining shapes of the tab to obtain locks having different characteristics in particular according to the nature of the plastic materials of the panels, FIG. 8 is a sectional view of another embodiment of the panel, FIG. 9 shows the movement for the assembly of two panels according to the embodiment of FIG. 8.

FIG. 10 in its parts 10a-10c shows the various steps for the manufacturing of the two machined sides, one being thermoformed, of a panel according to the invention where part 10d shows the assembly of two panels at the end of the assembly movement schematized in FIG. 9.

DESCRIPTION OF EMBODIMENTS OF THE INVENTION

To understand the issue resolved by the methods of the invention, it is essential to describe in detail the structure of the covering panel whose two complementary sides are concerned directly by the manufacturing method.

FIG. 1 shows the section (profile) of a covering panel (100) on the floor, wall or partition, made of plastic. The top (101) of the panel comprises decoration and the bottom of 102 can be provided with an insulating layer; the decor and the insulating layer are both integrated into the panel but are not shown in the illustrations. The panel (100) is an elongated rectangular panel comprising a rectangular or square panel.

The panel (100) has a pair of parallel sides for the assembly of complementary shapes along an assembly line and a pair of parallel sides transversely turned towards the first pair of size ensuring the assembly by the interleaving of the complementary shapes by one side being clipped into the matching side of a panel, already installed in this positioning row. Clipping is obtained by the movement of the panel in the course of installation. This pair of parallel transverse slides (1, 2) has means of assembly by the shape, completed on one side by a tab (known as the lock) and on the other, by a locking cavity accommodating the tab by clicking into place, and locking the movements perpendicular to the plane of the panel, and therefore the positioning plane.

Accordingly, the two edges or transverse sides (1, 2) of the same panel have matching shapes, that is, shapes designed to be assembled with complementary shapes of a matching side on the other panel (100).

In greater detail, the first side 1 consists of relief forming a hook (11) preceded by an assembly cavity (12) (first cavity) ending toward the top by a locking cavity (13) and a nose (14) reaching the junction plane (JP).

Generally, the second side (2) has a shape matching that of the first side, also with a sort of hook forming a protrusion (21) fitted with a lock (3). More accurately, the top (101) of the panel near the second side (2) extends beyond the bottom (back of panel) (102) by an inverted hook forming a protrusion (21) beyond a second assembly cavity (22). The protrusion (21) generally has a section complementing that of the first assembly cavity (12); the hook (11) and the second assembly cavity (22) have the same complementary section.

The edge of the protrusion (21) forms the connecting surface with the nose (14) atop the locking cavity (13) of the other junction plane (JP) panel. The protrusion consists of a nose (24) in the junction plane above a recess (23) continuing towards the underside (102) by a locking tab referred to more simply as the block (3) connecting to the protrusion (21). The recess (23) has a bottom (231).

The unreferenced bearing surface of the nose (14) and the beak (24) enters the junction plane (JP). Their intersection with the top (101) can consist of a chamfer which is not shown.

FIG. 2 is a sectional view of two panels (100, 100a) built according to the procedure of the invention and connected by clips complementary sides. To simplify the description, the second panel and its parts have the same numerical references as the identical components of the first panel (100) completed by the suffix (a). The first panel (100), by convention, is the panel already installed and the other panel (100a) is installed subsequently in the chronological order of the steps to install panels in the same row of panels. The joining of the profiles of the sides (1, 2a) of the two panels (100, 100a) takes place at the point of passage of the nose (14) which ensures the elastic or crushing of the lock (3a) partly engaged in the recess (23); then, by elastic means, the lock (3a) returns to brace against the upper side (131) of the locking cavity (13), locking the panel (100a) and preventing it from lifting with respect to the panel 100 in the junction plane (JP).

An example of the embodiment of the procedure for manufacturing these panels will be described in the following. In the preliminary steps, a piece of plastic material is cut into panel blanks, generally rectangular, having two pairs of parallel sides. The first pair of sides is machined by milling. The other pair of sides, those of the transverse sides, will be produced according to the method of the invention described below in FIG. 3. Details about the shape of the transverse sides and their implementation will be described by means of FIGS. 4, 5 and 6.

According to FIG. 3, limiting the presentation of the panel (100) to the section of the second side (2) provided with a lock (3), the method for producing a panel (100) consists initially in (I) in machining by milling the blank of the panel (110) with the temporary section shown, for the second side (2) while the first side 1 machined by milling has a final section as shown in FIG. 1.

Depending on the section of the blank (110) machined by milling, the temporary shape of the second side (2) includes the protrusion (21) and the second assembly cavity (22). The face of the protrusion (21) consists of a protruding beak (24) in the junction plane (JP) followed by an inset recess (23), to a depth (in the direction of the drawing plane) at least equal to the thickness of the future lock (3) not yet put into form in this just-machined state of the profile. The recess (23) continues in a curved convex bearing (33) connecting a groove (32) with a rounded bottom (321) then a tab (4). Preferably, this tab is inclined downwards or as an extension of protrusion (21) to form the open groove (32) connected to the bottom (231) of the recess (23) by a curved and convex support (33) (see also FIG. 4). This open end formed by the tab (4) allows the bottom (321) to be milled and is a mechanical operating advantage for locking, as will be described at a later stage.

The following phase (II) consists in locally heating the blank (110) in area Z enclosed by a circle, to soften the material of this junction zone with the base (41) of the tab (4). Local heating can be obtained by various means to limit it to the area needed for shaping, for instance, by infrared radiation heating, contact heating with a heating plate, heating by a hot air jet, or by a laser beam. The temperature rise is that produced by the softening of the plastic (vitreous transitional temperature).

During this phase (II), heating is limited locally to the junction area (Z) by the ratio of the masses of material between the base mass (41) of the tab (4) and that of the protrusion (21). Local heating does not destabilize the shape of the protrusion (21) or that of the convex bearing (32) or that of the recess contour (23) or that of the tab beyond its base (41).

As soon as the base (41) is heated to the temperature at which softening begins, depending on the composition of the material in this area, the tab (4) is lifted mechanically in the direction of the arrow (A) to obtain the permanent deformation of its base (41), to incline the tab (4) upwards, that is towards the top (101) and form an elastic lock (3) while leaving the free end (34) to protrude from the junction plane (JP).

This lifting by the pivoting of the tab (4) about its base (41) and beyond base (32) of groove (32) can be carried out by various mechanical means, not detailed, such as:
- a blade pressing against the underside of the tab (4) causing it to pivot into the required position,
- a wheel gradually raising the tab (4) in the direction perpendicular to the plane of the section shown in figure (3).
- The passage of the profile (200) on a ramp or a wheel, fixed, to gradually swivel the tab (4) from its position in the phase II to that recorded in phase III which is the state of the tab then forming the lock (3).

Post-forming is followed by the cooling (III) of the junction zone (Z) to stabilize this form of the base (31) of the lock (3).

After this stabilization, we obtain the post-formed side whose section is that of FIG. 5 with the base (41) of post-formed tab (4) having become the lock (3) held by its base (31).

FIGS. 4 and 5 illustrated, at an enlarged scale, the shape of the section of the second side of the rough for panel (110) after machining and panel side after the stabilization of its post-forming.

The section of FIG. 4 shows the side machined by milling, indicating the convex bearing (33) at the end of bottom (231) of recess (23) and the Vee-section of the groove (32) separating the convex bearing (33) and the adjacent side (322) of groove (32) at base (41) of tab (4) and the rounded contour (321) of groove (32). In this example of its embodiment, the tab (4) forms with the junction plane (JP), an angle (b) of more than 900 advantageous both for machining by milling and in favoring the elastic return effect of the future base (31) of lock (3).

The net separation of the facing surfaces after machining, that of the convex bearing (33) and that of the base side of the tab (4), which becomes side (322) of the groove (32), appears clearly in FIG. 5.

FIG. 5 shows groove (32) and its rounded bottom (321) separately from the domed bearing point (33) so that the elastic deformation of the lock (3) to allow the block to be clipped, causes the lock (3) to bend in an elastic manner, while applying it locally against this bearing point (33).

This movement benefits from the elasticity to allow the lock to be clipped into cavity (13) and come to bear against its upper side (131) by the bearing face (341) of its end (34).

This elastic deformation movement of lock (3) does not fatigue the bottom (321) of groove (32) and has it benefit from a lever arm effect between the contact with bearing point (33) and bottom (321). Neither does the locked position cause any incipient cracking because the lock (3), bearing against side (131) of the other panel and affected by alternating thrusting/compression actions when laid panel 100 is walked on, does not risk any fatigue and breakage at its base (31).

This geometry of base (31) is an important characteristic regarding the function of the lock (3).

FIGS. 6A, 6B show the clipping movement of the lock (3) by the folding down of panel (100a) with respect to an already laid panel (100) indicative of the accuracy required of the stable shapes of the panel sides produced according to the method of the invention.

It can be assumed that the panels (100a, 100) are assembled by pivoting about their parallel side(s) (in the XX direction) as depicted in FIGS. 6A, 6B with known pivoting/engaging movements. For this assembly operation, a row of panels is already assembled in the XX direction (assembly-line) and the next row is started with panel (100) already positioned and assembled onto the panels of the previous line.

The installation of the new panel 100a consists in engaging its side (orientation of the XX direction parallel to the plane of the drawing sheet) on the assembly edge of the panels of the previous row (first row) then folding it down by pivoting, in doing so, engaging not only the sides already connected to the corresponding side of the panel or panels of the row of panels already installed (first row), but also engaging its side (2a) in the first side (1) of panel (100) already laid in the second row. This method of engagement by pivoting is shown in FIGS. 6A, 6B by the arrow B.

FIG. 6A shows the beginning of the pivoting movement when the lock (3a) on the side (2a) gradually comes up against the nose (14) of the first side (1) of the laid panel (100), by elastically retracting into the recess (23).

During the pivoting, the complementary shapes gradually engage, starting near the tilting axis (XX direction, behind the drawing sheet) and moving forwards so that, as soon as the pivoting movement begins, one part of the second cavity (22a) of panel (100a) is sufficiently held by the engaging of the hook (11) of panel (100) already laid in this second row, to prevent any sliding of the panel (100a) in the direction (XX). The lock (3a) is therefore obliged to curve gradually by flexing elastically against the curved bearing point (33a), recessed from the junction plane (JP) to move over the face of the beak (14) then leave the end (34a) of the lock (3a) to extend elastically into the locking cavity (13) until reaching the final locking position shown in the FIG. 6B. The lock (3a) is then braced against the upper side (131) locking cavity (13) of panel (100) by its bearing face (341a). The lock (3) then bears elastically against the curved bearing point (33a), guaranteeing attachment, even in the event of movements to insert the covering strip (100) with respect to the covering strip (100a) under the effect of the weight of a person standing on the covering strip (100) and not on the covering strip (100a).

In this position, the angle (al) of the lock (3a) is greater than the angle (a) before engagement, creating this thrust holding the lock (3a) against the locking support.

To summarize, the procedure of forming the assembly sides of the panel produces a panel having particular characteristics in terms of its shape for fast and accurate assembly of the panels.

FIG. 7 shows in its parts (7a-7d) various shapes of strips (4a, -4d) used to obtain a lock (3) which itself is not shown. The locks (3) not shown have different mechanical properties depending on the particular characteristics of the material used for the covering strip (100). This description uses the same numerical references as above with different alphabetical suffixes to designate components that are mostly identical to those already described.

All the figures are limited to representing the end of the second transverse side (2a, -d) in its machined form but not yet final, as it will be after localized thermoforming, consisting in raising the tab (4a-4d) and fixing this form by cooling it.

According to FIG. 7a, the machined blank (110a) consists of the protrusion (21a) and the second assembly cavity (22a) and are simply sketched.

The face of the protrusion (21a) consists of a protruding beak (24a) entering the junction plane (JP) then the inset recess (23a) the bottom (231a) of which continues in a curved, convex bearing point (33a) connecting with a groove (32a) with a rounded bottom and a tab (4a) forming an extension to the protrusion (21a).

On the two sides, beyond the base (41a), the (4a) is thinner (412a) to increase the flexibility of the future lock. This alternative is advantageous for blades made of very rigid materials.

FIG. 7b shows another alternative of a machined blank (110b) the representation of which is confined to a single protrusion (21b). It is limited to a single inverted hook (21b) consisting of the protrusion of the beak (24b) leading to the junction plane (JP) and continuing by the inset recess (23b) of the junction plane and by a curved, convex bearing point (33b) as far as groove (32b) at base (41b) of tab (4b). The base (41b) of tab (4b) is enlarged with respect to the remainder of the tab (4b) which decreases up to the tip.

This shape of the tab (4b) which will act as a lock is advantageous for planks made of low density or flexible materials.

FIG. 7c shows another alternative of a machined blank (110c) the representation of which is confined to the hook (21c) alone. This hook is limited to a single protrusion (24c) leading to the junction plane (JP) and continuing by the inset recess (23c) of the junction plane (JP) and by a curved, convex bearing point (33c) as far as groove (32c) at base (41c) of tab (4c). The base (41b) is reduced with respect to the remainder of the tab (4c) which increases up to the tip.

This shape of the tab (4c) which will act as a lock is advantageous for covering strips made of very rigid materials that are difficult to bend.

FIG. 4d shows another alternative of the machined blank (110d) the representation of which is limited to the inverted hook (21d) which consists of the protrusion (24d) leading to the junction plane (JP) and continuing by the inset recess (23d) in the junction plane.

The flat bottom (231d) reaches the groove (32d) at the base (41d) of the tab (4d).

The base (41d) has a bearing surface (42d) to increase resistance to vertical forces applied to the lock, made by the local thermoforming of the tab (4d).

FIGS. 8, 9, 10 show another embodiment of the panel (200) according to the invention, maintaining the basic structure of the transverse sides (1, 2) but reversing the locking system with the lock formed on the transverse side (a) and its housing, forming a sort of latch, made on the transverse side (2).

Accordingly, to designate the inverted male (M)/female (F) components of the sides, the references (1, 2) will be completed by the suffixes (M) and (F).

The side (1) which was previously a female side in the previous embodiment has a lock (3M) and a recess (23M) while the transverse side (2) which was the male side, has a locking cavity (13F) and its bearing side (131F).

It will be noted that the lock (3M) is obtained from a tab (4) which is the type of tab (4d) (FIG. 7d) designed to provide a strong seat. It consists of the nose (14M) (FIG. 8) which remains in the junction plane (JP) of this end (1M) and which is not rounded at the base, shaped as in the part (31a) of FIG. 6A because the nose (14m) extends as far as the top (201) of the panel (200). The bottom of the panel (200) bears reference (202).

The other parts are identical to those of the sides (1, 2) of the previous embodiments and have the same numerical references, completed simply by the suffix (M) or the suffix (F).

Accordingly, the side (1M) has a hook (11M) and a locking cavity (12M) whereas the side (2F) has an inverted hook (21F) and an assembly cavity (22F).

FIG. 9 is a schematic view of the clipping together of two panels by their transverse sides (smaller sides).

The panel (200-1) is the installed panel whose side (1M) receives the side (2F) of panel (200-2) which descends in the direction suggested by the arrow (FD).

The results of the clipping action are shown in FIG. 10*d*.

FIGS. 10*a*-10*d* illustrate the main phases for the production and assembly of the transverse sides (2F, 1M) of panel (200).

The transverse side (2F) is obtained by the machining of beak (24F) forming the junction plane (JP) and the locking cavity (13F) with its bearing side (131F) for the lock (3M). Then, there is the guiding surface (211F) of the inverted hook (21F).

Machining is carried out in addition to the machining of the cavity (22F) and the other sides of hook (21F).

The first transverse side (1M) is machined according to the profile shown in FIG. 10*b*. This shape is accessible to continuous/continuous feed machining tools, such as milling tools. Accordingly, tab (4M) is machined leaving an area (16M) above the one corresponding to the nose (14) of the embodiment shown on FIG. 1. Then by local thermoforming applied to the base of the tab (4M) the tab, whose base has softened, is folded down (231M) towards the recess (23M) and this folded state is fixed by cooling the thermoforming area. The lock (3M) is obtained in this way.

FIG. 10*d* shows the assembled/clicked in state of the two transverse sides (1M/2F).

LIST OF MAIN COMPONENTS

100,200 Panels
110,210 Blank panel
100*a* Other panel
101,201 Top of panel
102,202 Bottom of panel/Back of panel
1, 1M First transverse side
   11, 11M Hook
   12, 12M Assembly cavity/first cavity
   13, 13F Locking cavity
      131F Top side
   14 Nose
2, 2F Second transverse side
   21, 21*a-d*, 21F Inverted/protruding hook
   211F Guide surface
   22, 22F Assembly cavity/second cavity
   23, 23M Recess
      231, 231M, 231*a-d* Bottom of recess
   24, 24F Nose
3, 3M Lock
   31 Shaping bar
   32, 32*a-d* Groove
      321 Rounded bottom of groove
      322 Side of lock
   33 Convex curved bearing
   34 Free end
      341 Bearing face
4, 4*a-d*, 4M Tab
   41, 41*a-d* Base of tab
      411 Side of tab

42*d* Seat
JP Junction plane
FD Clipping direction

The invention claimed is:

1. A method for manufacturing a plastic covering panel comprising two pairs of parallel sides to be assembled by the two pairs of parallel sides with other panels comprising pairs of sides that have matching assembly profiles, the matching assembly profiles comprising one top profile and one bottom profile, wherein the sides of both the plastic covering panel and the other panels are assembled on junction planes with each panel, the method comprising:

assembling one pair of the two pairs of parallel sides by pivoting one of the parallel sides into a matching side of a previously installed panel; and assembling a pair of transverse sides by interleaving the pair of transverse sides and clipping, by the interleaving, the pair of transverse sides in a corresponding transverse side of the previously installed panel, wherein a first transverse side in the pair of transverse sides has a junction plane an edge of a tarp of the plastic covering panel, wherein the first transverse side extends to a locking cavity opening at a top of the plastic covering panel and is shaped as a hook, wherein a second transverse side in the pair of transverse sides matches the first transverse side and has an upper edge in the junction plane terminating in a protrusion, wherein the second transverse side is separated from a body of the plastic covering panel an assembly cavity of the plastic covering panel fitting over a hook located in a further panel and a protrusion housed in an assembly cavity of the further panel, wherein a blank is formed from the pair of transverse sides, thereby providing a final section to the first transverse side and forming, on the second transverse side, an assembly cavity opening into a bottom portion and the protrusion, comprising a beak, entering the junction plane, followed by an insert recess from the junction plane, wherein the bottom of the insert recess extends in a protruding tab that protrudes from a base of the protrusion, wherein an area at a base of the protruding tab is heated locally, wherein, when the area at the base of the protruding tab has softened due to the local heating, the protruding tab is raised towards the insert recess to form a lock, and wherein the plastic covering panel is further stabilized via cooling, thereby resulting in a final shape of the pair of transverse sides.

2. The method of manufacturing a plastic covering panel according to claim 1, wherein a blank of the pair of transverse sides is formed by lathe milling the first transverse side to the final section and by milling and forming on the second transverse side the assembly cavity opening out into the bottom portion and the protrusion with the beak, followed by the insert recess from the junction plane, wherein the bottom of the insert recess extends, by a curved convex bearing point, to connect to a beginning of a groove, wherein the groove extends by the protruding tab from the base of the protrusion.

3. The method of manufacturing a plastic covering panel according to claim 2, wherein at least one of the pair of transverse sides is machined by milling.

4. The method of manufacturing a plastic covering panel according to claim 2, wherein a rounded groove is formed to connect the curved bearing point and a side of the base of the protruding tab.

5. The method of manufacturing a plastic covering panel according to claim 1, wherein the protruding tab is formed at an inclination angle with respect to the junction plane of the plastic covering panel, wherein the inclination angle is greater than 90°.

6. A method of manufacturing a plastic covering panel comprising two pairs of parallel sides to be assembled with other panels comprising pairs of sides that have matching assembly profiles, the method comprising:
assembling one pair of the two pairs of parallel sides by pivoting one of the parallel sides into a matching side of a previously laid panel; and
assembling a pair of transverse sides by interleaving the pair of transverse sides and clipping, by the interleaving, the pair of transverse sides in a corresponding transverse side of the previously laid panel,
wherein a first side transverse side in the pair of transverse sides comprises a hook and a first assembly cavity, wherein the first assembly cavity opens into a top of the plastic covering panel, wherein a junction plane of both of the pair of transverse sides passes through the first assembly cavity,
wherein a locking cavity is inset from the junction plane, wherein an upper side of the locking cavity forms a bearing surface,
wherein a second side of the pair of transverse sides comprises a second assembly cavity, wherein the second assembly cavity opens into a bottom of the covering panel and receives a first hook of an adjacent panel, wherein an inverted hook forms a protrusion that enters the assembly cavity on a first side of the adjacent panel,
  wherein a side of the protrusion comprises a beak, wherein a bearing surface of the protrusion is in the junction plane, and reaches a top of the covering panel,
  wherein a recess insert from the junction plane extends to the bottom by a flexible lock having a shape of an inclined tab, wherein the inclined tab is oriented towards the top and has a base that derives from the protrusion, wherein
a blank of the pair of transverse sides is formed by lathe milling the first transverse side to a final section and by lathe milling on the second side an assembly cavity, wherein the assembly cavity opens out into a bottom portion and the protrusion, comprising a beak, is followed by a recess insert from the junction plane, wherein the bottom of the recess insert connects to a beginning of a groove, wherein the groove extends by a protruding tab from the base of the protrusion,
wherein an area at a base of the protruding tab is heated locally,
wherein, when the area at the base of the protruding tab has softened due to the local heating, the protruding tab is raised towards the recess insert to form a lock, and
wherein the plastic covering panel is further stabilized via cooling, thereby resulting in a final shape of the pair of transverse sides.

7. A plastic covering panel comprising two pairs of parallel sides to be assembled with other panels comprising pairs of sides, wherein the pairs of sides have matching assembly profiles, wherein the plastic covering panel is made according to the method of claim 1, wherein the plastic covering panel further comprises:
one pair of sides configured to be assembled by pivoting of one side of the one pair of sides into a matching side of a previously laid panel; and
one pair of transverse sides configured to be assembled by interleaving the pair of transverse sides and clipping, by the interleaving, the pair of transverse sides in a corresponding transverse side of the previously laid panel,
wherein a first side of the pair of transverse sides comprises a hook and a first assembly cavity, wherein the first assembly cavity opens into a top of the covering panel, wherein a junction plane of both sides in the pair of transverse sides passes through the first assembly cavity,
wherein a locking cavity is inset from the junction plane, wherein an upper side of the locking cavity forms a bearing surface,
wherein a second side of the pair of transverse sides comprises a second assembly cavity, wherein the second assembly cavity opens into a bottom of the covering panel and receives a hook of an adjacent panel, wherein an inverted hook forms a protrusion that enters the assembly cavity on a first side of the adjacent panel,
wherein a side of the protrusion comprises a beak, wherein a bearing surface of the protrusion is in the junction plane and reaches a top of the covering panel,
wherein a recess insert from the junction plane extends to the bottom by a flexible lock having a shape of an inclined tab, wherein the inclined tab is oriented towards the top and has a base that derives from the protrusion, and
wherein the flexible lock is formed from a strip chosen from the group consisting of: a strip with local reduction in thickness, a strip with an enlarged base when the strip is compared to the thickness of a strip that decreases towards an end, a strip with a reduced base when the strip is compared to the thickness of a strip that increases towards an end, a strip with an increased bearing surface, and combinations thereof.

8. A plastic covering panel comprising two pairs of parallel sides to be assembled with other panels comprising pairs of sides, wherein the pairs of sides have matching assembly profiles, wherein the plastic covering panel is made according to the method of claim 1, wherein the plastic covering panel further comprises:
one pair of sides configured to be assembled by pivoting of one side of the one pair of sides into a matching side of a previously laid panel; and
one pair of transverse sides configured to be assembled by interleaving the pair of transverse sides and clipping, by the interleaving, the pair of transverse sides in a corresponding transverse side of the previously laid panel,
wherein a first side of the pair of transverse sides comprises a hook and a first assembly cavity, wherein the first assembly cavity opens into a top of the covering panel, wherein a junction plane of both sides in the pair of transverse sides passes through the first assembly cavity,
wherein a locking cavity is inset from the junction plane, wherein an upper side of the locking cavity forms a bearing surface,
wherein a second side of the pair of transverse sides comprises a second assembly cavity, wherein the second assembly cavity opens into a bottom of the covering panel and receives a hook of an adjacent panel,
wherein an inverted hook forms a protrusion that enters the assembly cavity on a first side of the adjacent panel, wherein a side of the protrusion comprises a beak,
  wherein a bearing surface of the protrusion is in the junction plane and reaches a top of the covering panel,
wherein a recess insert from the junction plane extends to the bottom by a flexible lock having a shape of an inclined tab, wherein the inclined tab is oriented towards the top and has a base that derives from the protrusion,
wherein the hooks of both of the pair of transverse sides is preceded by the corresponding assembly cavity,
wherein the hook of the first transverse side is engaged in a cavity of a second transverse side of a preceding panel, and, reciprocally, the cavity of the second transverse side of the preceding panel receives the hook of the first transverse side of the covering panel,
wherein the side of the protrusion comprising a beak has a further locking cavity, wherein the side forms a bearing surface for a lock on the preceding panel, and
wherein the side forming a nose above an assembly cavity of the preceding panel is followed by the lock of the preceding panel located beneath the nose.

\* \* \* \* \*